United States Patent [19]

Jaskie

[11] Patent Number: 5,107,533
[45] Date of Patent: Apr. 21, 1992

[54] OPTICAL SWITCH UTILIZING ELECTROSTATIC DEFORMATION OF AN OPTICALLY TRANSPARENT ELASTOMER

[76] Inventor: James E. Jaskie, Scottsdale, Ariz.

[21] Appl. No.: 646,127

[22] Filed: Jan. 28, 1991

[51] Int. Cl.$^5$ ............................................. G02B 6/26
[52] U.S. Cl. ..................................... 385/18; 359/291; 385/40
[58] Field of Search ............... 350/96.10, 96.13, 96.14, 350/96.15, 96.16, 96.20, 96.21, 359, 360; 385/16–23, 39, 40; 359/291, 294, 295

[56] References Cited

U.S. PATENT DOCUMENTS

| 4,001,635 | 1/1977 | d'Auria et al. | 350/360 X |
| 4,035,061 | 7/1977 | Sheridon | 350/360 |
| 4,106,848 | 8/1978 | Conwell et al. | 350/96.14 |
| 4,182,553 | 1/1980 | Sheridon | 350/360 X |

FOREIGN PATENT DOCUMENTS 57-195202  11/1982  Japan ................................. 350/96.13

OTHER PUBLICATIONS

Uberbacher, "Fiber Optic Illuminated Switch", *IBM Tech. Discl. Bull.*, vol. 18, No. 2, Jul. 1975, p. 483.

Primary Examiner—John D. Lee
Attorney, Agent, or Firm—Joe E. Barbee

[57] ABSTRACT

An otpical switch utilizing electrostatic deformation of an optically transparent elastomer. The switch is easily fabricated at a low cost using readily available and easily handled materials. The switch consists of legs made from stripes of an elastomer which meet at a flat interface. This interface reflects light from a first leg into a second leg. To enable the switch, the flat surface is deformed by electrostatic forces so that light from the first leg will no longer be reflected but will pass into a third leg. The invention provides low attenuation of light along the selected path combined with low leakage along the non-selected path. The optical switch does not compromise the unique advantages of optical signal transmission.

19 Claims, 1 Drawing Sheet

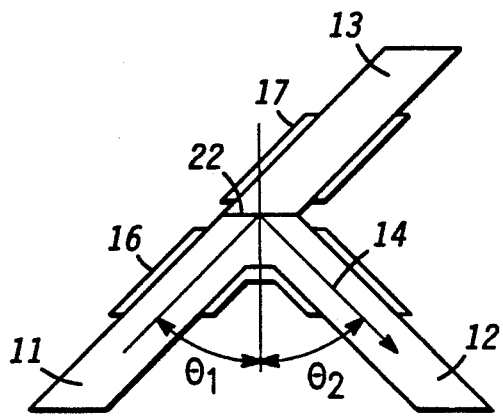
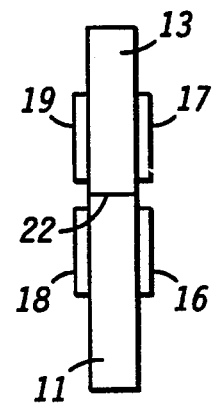
*FIG. 1*  *FIG. 2*
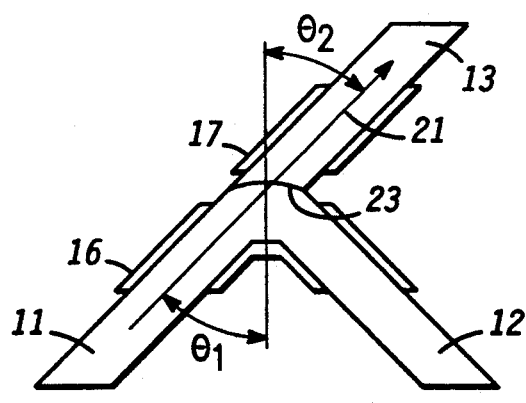
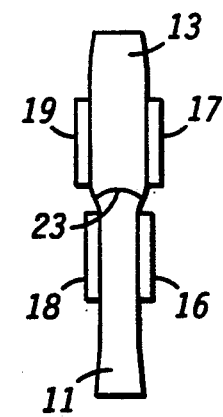
*FIG. 3*  *FIG. 4*

OPTICAL SWITCH UTILIZING ELECTROSTATIC DEFORMATION OF AN OPTICALLY TRANSPARENT ELASTOMER

BACKGROUND OF THE INVENTION

The present invention relates, in general, to an optical switch, and more particularly to an optical switch utilizing electrostatic deformation of an optically transparent elastomer.

In optical systems it is important to have a low cost and reliable means of switching an optical signal between various destinations. Applications of an optical switch include selection of a computer terminal or a computer node on an optical local area network, selection of between multiple programming sources on a cable TV distribution system, and routing of optical signals in a broadband switched communications network. Optical transmission of signals provides many advantages over other methods including a unique combination of wide signal bandwidth, low crosstalk between different signals, and almost total immunity from electromagnetic interference. It is extremely important that any switching method not compromise these advantages.

Past approaches to optical switches have included the use of electro-optical effects for switching. These approaches induce a refractive index change by carrier injection into various silicon, gallium arsenide or lithium niobate based structures. Electro-optical effects are inherently weak effects which require a long common path length and small cross section for the switch. This produces a high level of crosstalk between switch elements as well as excessive signal loss along the desired path. In addition the materials used and the complexity of the structures make these approaches expensive to produce. There remains a need for a low cost and reliable method to switch optical signals which does not compromise the unique advantages of optical signal transmission.

SUMMARY OF THE INVENTION

Briefly stated, the present invention provides a low cost way to switch an optical signal between two destinations without degrading the unique advantages of optical signal transmission. The invention provides three legs of a light guide made from stripes of an optically transparent elastomer which meet at a flat interface. This interface reflects light from the first leg into the second leg. To enable the switch, an electrostatic force is applied to the legs deforming the elastomer and distorting the flat interface so that light from the first leg will no longer be reflected but will pass into the third leg. Switching in this way is inherently low loss to the selected leg and high loss to the non-selected leg. Simple measures such as polarization of the light or non-reflective coatings on the outside of the light guides may be used to achieve even better attenuation of light leakage to the non-selected leg. The invention exhibits none of the problems inherent in mechanical switches.

The invention can also be practiced to switch an optical signal between only two legs, thereby providing an on-off switch.

BRIEF DESCRIPTION OF THE DRAWINGS

FIG. 1 shows a top view of an optical switch in accordance with this invention in a quiescent state;

FIG. 2 shows a side view of the switch shown in FIG. 1;

FIG. 3 shows a top view of the switch shown in FIG. 1 in an active state; and

FIG. 4 shows a side view of the switch shown in FIG. 3.

DETAILED DESCRIPTION OF THE DRAWINGS

FIG. 1 shows a top view of an optical switch in accordance with this invention when the optical switch is in a quiescent state, that is without a voltage applied to cause switching. A common leg 11, a switched leg 12 and a switched leg 13 are stripes fabricated from an optically transparent elastomer material and serve as light guides. The stripes might be embodied variously on a substrate, on a circuit board, or as part of an optical connector. Typical materials that are useful for the optically transparent elastomer are non-compressible polymer compounds. A few suitable commercial products are: RTV615 a product of General Electric Co., KJR-9023E a product of Shin-Etsu Chemical Co., Sylgard (trademark) and Ultek (trademark).

Common leg 11 and switched leg 12 are made from an optically transparent elastomer material with an index of refraction $n_1$. Switched leg 13 is made from a different optically transparent elastomer material having a different index of reflection $n_2$. Switched leg 13 meets common leg 11 and switched leg 12 at an interface surface 22. Interface surface 22 is fabricated as a substantially flat junction or surface. The angle $\theta_1$ between common leg 11 and interface surface 22 is greater than the critical angle of incidence $\theta_C$ at which total reflection of light by interface surface 22 will occur. These angles are given by the equations:

$$\theta_1 > \theta_C = \sin^{-1}(n_2/n_1).$$

The angle of incidence $\theta_2$ between interface surface 22 and switched leg 12 must be equal to $\theta_1$ for the light to be reflected into switched leg 12 along a light beam 14. An electrode 16 is bonded to the underside of common leg 11 and switched leg 12. Likewise an electrode 17 is bonded to the underside of switched leg 13. Top electrodes are not shown in this view to avoid obscuring other details in FIG. 1.

FIG. 2 is a side view of the switch shown in FIG. 1. In this view electrode 16 is shown matched with an electrode 18 bonded to the upper side of common leg 11 and switched leg 12. Likewise electrode 17 is shown matched with an electrode 19 bonded to the upper side of switched leg 13. In the quiescent state shown by FIG. 2, there is no voltage applied to electrodes 16, 17, 18, and 19. As a result there exists no electrostatic force between electrodes 16, 17, 18, and 19, so the optically transparent elastomer material will assume its natural shape. As a result, interface surface 22 will be the substantially flat surface as fabricated and shown in FIGS. 1 and 2.

FIG. 3 is a top view of the switch as shown in FIG. 1 in an active state, that is with appropriate voltages applied to electrodes 16 and 17 and top electrodes 18 and 19 (FIGS. 2 and 4). Interface surface 22 (FIG. 1) is shown deformed into a curved interface surface 23. A light beam 21 from common leg 11 striking curved interface surface 23 will have an angle of incidence less than the critical angle of incidence $\theta_C$. As a result light beam 21 will pass from common leg 11 through curved interface surface 23 and along switched leg 13 rather than being reflected into switched leg 12 as illustrated by light beam 14 (FIG. 1).

Alternative embodiments of the invention vary the shapes of electrodes 16 and 17 together with the shapes of top electrodes 18 and 19 (FIGS. 2 and 4) so as to apply the electrostatic forces unevenly on the optically transparent elastomer material inducing a predetermined shape for curved interface surface 23. The preferred embodiment shown in FIG. 3 uses this effect to shape curved interface surface 23 into a segment of a sphere. A spherical shape for curved interface surface 23 allows light beam 21 to pass through curved interface surface 23 without distortion.

FIG. 4 is a side view of the switch of FIG. 3 with the addition of top electrodes 18 and 19. In this view voltages of opposing polarity are applied to electrodes 16 and 18 producing an electrostatic attraction force $F_1$ between electrodes 16 and 18. An electrostatic force F varies with the applied charge q, dielectric constant of the optically transparent elastomer material $\epsilon$, and the overlapping area of the electrodes A. The magnitude of electrostatic force F is given by the equation:

$$F = \frac{q^2}{2\epsilon A}.$$

Attraction force $F_1$ will compress the optically transparent elastomer material of common leg 11 and switched leg 12 in a vertical direction. Common leg 11 and switched leg 12 will bulge along the edges to relieve the stress of this compression. A voltage of like polarity is applied to electrodes 17 and 19 to produce an electrostatic repulsion force $F_2$ between electrodes 17 and 19. Force $F_2$ will stretch the optically transparent elastomer material of switched leg 13. Switched leg 13 will contract along the edges to relieve the stress of stretching from force $F_2$. This contraction adds to the bulging of legs 11 and 12 to further deform curved interface surface 23 into the desired shape.

There is a small amount of reflection of light beam 21 (FIG. 3) from curved interface surface 23 given by the equation:

$$R = \left| \frac{n_1 - n_2}{n_1 + n_2} \right|^2.$$

For a typical optically transparent elastomer material $R \approx 0.01$. Embodiments of this invention having even lower reflection incorporate an optical trap means such as a black coating on the outside of common leg 11 and switched leg 12 in the bight of the angle between them, opposite the region where the reflection takes place. Another embodiment of the invention, useful when the polarization of light beam 14 (FIG. 1) and light beam 21 (FIG. 3) are known, utilizes Brewster's angle to guarantee essentially full absorption of the undesired reflected light. In this embodiment the angle $\theta_1$ between common leg 11 and interface surface 22 (FIG. 1) is arranged to be greater than Brewster's angle, the angle above which a specific polarization of the light is reflected. Curved interface surface 23 is arranged so the angle of incidence of the light to curved interface surface 23 is less than Brewster's angle, where extremely good absorption of this polarization of the light takes place.

Alternative embodiments of this invention include the use of different shaped electrodes, position electrodes on only one or two of the legs, and utilize a compressible material for one of the optically transparent elastomers. A different embodiment comprises one of the two switched legs implementing an optical off-on switch. One form of this embodiment utilizes a single type of optically transparent elastomer comprising common leg 11, switched leg 12, and electrodes 16 and 18. Switched leg 13 and electrodes 17 and 19 are not included in this form of the embodiment. An alternative form of this embodiment comprises common leg 11, electrodes 16 and 18, switched leg 13 and electrodes 17 and 19. In this form of the embodiment switched leg 13 utilizes a different type of optically transparent polymer having a different index of refraction from that used for common leg 11. Operation of these on-off embodiments is similar to that of the preferred embodiment having two switched legs illustrated in FIG. 1 through FIG. 4 except that light sent to the nonexistent switched leg is absorbed within the switch or reflected back to the source or an optical trap.

Yet another embodiment is to manufacture the stripes of optically transparent elastomer so that they form an interface surface which is similar to curved interface surface 23 (FIG. 3) in the quiescent state rather than in the active state. This embodiment reverses operation of the switch from that described above. The switch now functions as illustrated in FIG. 3 when in the quiescent state, with no reflection of light from common leg 11 by curved interface surface 23 into switched leg 12, instead the light passes through curved interface surface 23 and into switched leg 13. The active state, with electrostatic forces applied to the legs, now functions as illustrated in FIG. 1 deforming the interface surface which is similar to curved interface surface 23 and producing an interface surface which is similar to substantially flat interface surface 22. This active state provides reflection of light from common leg 11 into switched leg 12, allowing no light to pass through into switched leg 13.

This invention provides an optical switch that overcomes the deficiencies of previous optical switches. The invention is easily fabricated at a low cost using readily available and easily handled materials. There are no mechanical parts to break, wear out, or jam. The invention may be manufactured in a wide variety of sizes, requiring only that the cross section of the stripe be large enough to pass the wavelength of light being used. Degradation of the light beam passing through the invention is minimal and there is a high attenuation of light along the non-selected signal path. Finally, this invention does not compromise the electromagnetic interference immunity, crosstalk immunity or bandwidth advantages that make optical communication desirable.

I claim:

1. An optical switch utilizing electrostatic deformation of an optically transparent elastomer, comprising:
    a first stripe of a first optically transparent elastomer having a common leg and a first switched leg which meet at an angle with a substantially flat surface at the apex of the angle, the angle of incidence being such that light is reflected through the angle between the common leg and the switched leg by the substantially flat surface;
    a second stripe of a second optically transparent elastomer having a different index of refraction from the first optically transparent elastomer, coupled through an optical interface at the substantially flat surface between the common leg and the first switched leg to form a second switched leg; and at least one pair of electrodes attached above and below at least one leg of the first stripe such that the stripe can be deformed by electrostatic forces to bend the substantially flat surface beyond the critical angle at which reflection of light from the common leg and into the first switched leg occurs so light will pass into the second switched leg instead.

2. The optical switch of claim 1 further comprising:
a second set of electrodes attached both above and below the second switched leg acting to deform the second switched leg to complement the effect of the first set of electrodes in distorting the optical interface.

3. The optical switch of claim 1 further comprising:
an optical trap means along part of the common leg in such a way as to further attenuate light transmission into a undesired switched leg.

4. The optical switch of claim 1 wherein light has a predetermined polarization and the angle between the common leg and the first switched leg is such that the angle of incidence of the light from the common leg to the substantially flat surface is greater than Brewster's angle and the angle of incidence of the light onto the substantially flat surface as deformed by electrostatic forces is less than Brewster's angle.

5. The optical switch of claim 1 wherein at least one pair of electrodes is shaped such that electrostatic forces are applied unevenly to the first stripe in such a way as to cause the substantially flat surface to deform into a predetermined shape.

6. An optical switch utilizing electrostatic deformation of an optically transparent elastomer, comprising:
a first light guide formed from a first optically transparent elastomer;
a second light guide formed to join with the first light guide, having a substantially flat interface surface at a meeting of the first and second light guides, the angle between the light guides and the interface surface forming an acute angle which is greater than zero such that incident light from the first light guide will reflect from the interface surface into the second light guide; and
a first set of electrodes attached to the light guides in pairs above and below the light guides in the vicinity of the interface surface and in such a manner that application of a voltage between pairs of electrodes will compress the light guide causing a distortion of the interface surface to the point where no reflection of light will pass through the interface surface and not into the second light guide.

7. An optical switch utilizing electrostatic deformation of an optically transparent elastomer, comprising:
a first light guide formed from a first optically transparent elastomer;
a second light guide formed from a second optically transparent elastomer having a different index of refraction from the first optically transparent elastomer and formed to join with the first light guide, having an interface surface at a meeting point of the first and second light guides such that incident light which passes along the longest dimension of the first light guide will reflect from the interface surface and will not pass through into the second light guide; and a first set of electrodes attached to the light guides in pairs above and below the light guides in the vicinity of the interface surface and in such a manner that application of a voltage between pairs of electrodes will deform the light guide causing a distortion of the interface surface to the point where no reflection of light from the first light guide occurs and light will pass through the interface surface and along the longest dimension of the second light guide.

8. An optical switch utilizing electrostatic deformation of an optically transparent elastomer, comprising:
a first light guide formed from a first optically transparent elastomer;
a second light guide formed from a second optically transparent elastomer having a different index of refraction from the first optically transparent elastomer and formed to join with the first light guide, having an interface surface at a meeting point of the first and second light guides such that incident light from the first light guide will reflect from the interface surface and will not pass through into the second light guide; and
a first set of electrodes attached to the light guides in pairs above and below the light guides in the vicinity of the interface surface and in such a manner that application of a voltage between pairs of electrodes will deform the light guide causing a distortion of the interface surface to the point where no reflection of light from the first light guide occurs and light will pass through the interface surface into the second light guide.
a third light guide formed from the first optically transparent elastomer formed to join with the first light guide at the interface surface at an angle such that light will reflect from the interface surface into the third light guide except when the interface surface is distorted beyond the point where reflection occurs.

9. The optical switch of claim 8 further comprising:
a second set of electrodes attached both above and below the second light guide in the vicinity of the interface surface so that when a voltage of unlike polarity is applied to the above and below electrodes the second light guide will compress to augment the effect of the first set of electrodes in distorting the interface surface.

10. An optical switch utilizing electrostatic deformation of an optically transparent elastomer, comprising:
a first stripe of elastomer;
a second stripe of elastomer joining the first stripe of elastomer at an interface surface so that light can pass along the longest dimension of the first stripe to the longest dimension of the second stripe; and
at least one pair of electrodes positioned above and below the first stripe of elastomer to alter the shape of the interface surface thereby controlling the passage of light from the first stripe into the second strip.

11. The optical switch of claim 10 wherein:
the first stripe and the second strip meet at an angle having the interface surface formed as a substantially flat surface at the junction of the first stripe and the second stripe, the angle being such that light is reflected from the first stripe into the second stripe, and wherein the interface surface is deformed into a curved interface surface which no longer reflects light from the first stripe into the second stripe upon application of a voltage to at least one pair of electrodes.

12. The optical switch of claim 10 wherein:
the second stripe is made from an elastomer having a different index of refraction from the first stripe, the interface surface between the first stripe and the second stripe being formed as a substantially flat surface which reflects light from the first stripe so the light does not pass into the second stripe, and wherein the interface surface is deformed into a curved interface surface which no longer reflects light from the first stripe but allows the light to pass through and into the second stripe when a voltage is applied to at least one pair of electrodes.

13. The optical switch of claim 10 further comprising:
the interface surface being formed as a curved interface surface which is deformed into a substantially flat surface by application of electrostatic forces.

14. A method for switching an optical signal between two destinations comprising:
forming a first stripe of a first optically transparent elastomer having a common leg and a first switched leg which meet at an angle greater than zero with a substantially flat surface at the apex of the angle to form an optical interface between the common leg and the switched leg, the angle being such that a light beam is reflected through the angle between the common leg and the first switched leg by the substantially flat surface; and
attaching at least one pair of electrodes above and below at least one leg of the first stripe such that the stripe can be deformed by electrostatic forces bending the optical interface beyond the critical angle at which reflection of the light beam from the common leg and into the first switched leg occurs so the light beam will pass through the optical interface instead.

15. The method of claim 14 further including shaping pairs of electrodes such that electrostatic forces are applied unevenly causing the substantially flat surface to deform into a predetermined shape.

16. A method for switching an optical signal between two destinations comprising:
forming a first stripe of a first optically transparent elastomer having a common leg and a first switched leg which meet at an angle with a substantially flat surface at the apex of the angle to form an optical interface between the common leg and the switched leg, the angle being such that a light beam is reflected through the angle between the common leg and the first switched leg by the substantially flat surface; and
attaching at least one pair of electrodes above and below at least one leg of the first stripe such that the strip can be deformed by electrostatic forces bending the optical interface beyond the critical angle at which reflection of the light beam from the common leg and into the first switched leg occurs so the light beam will pass through the optical interface instead; and
forming a second stripe of a second optically transparent elastomer having a different index of refraction from the first optically transparent elastomer and coupling the second stripe to the first stripe through an optical interface at the substantially flat surface, thereby forming a second switched leg such that when the optical interface is distorted to allow the light beam to pass through the optical interface then the light beam will pass into the second switched leg.

17. The method of claim 16 further including:
attaching a second set of electrodes both above and below the second stripe so that an applied voltage of a like polarity acts to stretch the second stripe thereby augmenting the effect of the first set of electrodes in distorting the substantially flat surface.

18. The method of claim 16 further including:
providing an optical trap means along part of the common leg in such a way as to further attenuate transmission of the light beam into the undesired switched leg.

19. The method of claim 16 further including a light beam with a predetermined polarization, and forming the angle between the common leg and the first switched leg such that the angle of incidence of the light beam from the common leg to the substantially flat surface is greater than Brewster's angle and the angle of incidence of the light beam onto the substantially flat surface as deformed by electrostatic forces is less than Brewster's angle.

* * * * *

UNITED STATES PATENT AND TRADEMARK OFFICE
CERTIFICATE OF CORRECTION

PATENT NO. : 5,107,533
DATED : April 21, 1992
INVENTOR(S) : JAMES E. JASKIE It is certified that error appears in the above-identified patent and that said Letters Patent is hereby corrected as shown below:

Column 5, claim 5, line 52, after "light" insert --from the first light guide occurs and light--.

Column 6, claim 10, line 59, change "strip" to --stripe--.

Column 6, claim 11, line 61, change "strip" to --stripe--.

Column 8, claim 16, line 9, change "strip" to --stripe--.

Signed and Sealed this

Thirtieth Day of November, 1993

Attest:

BRUCE LEHMAN

Attesting Officer

Commissioner of Patents and Trademarks